United States Patent [19]

Skruch et al.

[11] Patent Number: 5,149,346
[45] Date of Patent: Sep. 22, 1992

[54] APPARATUS FOR REDUCTION OF VIBRATION IN LIQUID-INJECTED GAS COMPRESSOR SYSTEM

[75] Inventors: Harry J. Skruch, Baltimore; John R. Ward, Owings, both of Md.

[73] Assignee: The United States of America as represented by the Secretary of the Navy, Washington, D.C.

[21] Appl. No.: 718,322

[22] Filed: Jun. 17, 1991

[51] Int. Cl.⁵ ............................................. B01D 45/12
[52] U.S. Cl. ...................................... 55/438; 55/455; 418/DIG. 1; 62/470
[58] Field of Search .................... 55/455, 439, 438; 418/DIG. 1; 62/470

[56] References Cited

U.S. PATENT DOCUMENTS

| | | | |
|---|---|---|---|
| 2,002,033 | 5/1935 | Kopsa | 62/470 |
| 2,709,501 | 5/1955 | Toth et al. | 55/455 |
| 2,925,884 | 2/1960 | Campbell | 55/455 |
| 3,386,230 | 6/1968 | Riesberg et al. | 55/457 |
| 4,478,054 | 10/1984 | Shaw et al. | 418/DIG. 1 |
| 4,913,634 | 4/1990 | Nagata et al. | 418/DIG. 1 |
| 4,957,517 | 9/1990 | Linnert | 55/184 |

Primary Examiner—Bernard Nozick
Attorney, Agent, or Firm—Charles D. Miller

[57] ABSTRACT

An apparatus for reducing high vibration and pulsation levels generated by the discharge of gas-liquid mixtures from compressors. A tuyere is positioned within the compressor housing to separate the gas from the liquid.

1 Claim, 3 Drawing Sheets

APPARATUS FOR REDUCTION OF VIBRATION IN LIQUID-INJECTED GAS COMPRESSOR SYSTEM invention described herein may be manufactured and used by or for the government of the United States of America for governmental purposes without the payment of any royalties thereon or therefor.

BACKGROUND OF THE INVENTION

The present invention relates in general to a process and apparatus for reduction or elimination of vibrations in shipboard liquid-lubricated air compressor systems and, more particularly, to a process and apparatus which reduce or eliminate pulsations, vibrations and noise in the air piping on the discharge side of water-injected rotary positive displacement screw type air compressors.

Rotary positive displacement single screw compressors may be used to produce high air discharge pressures ranging to about 3,000–5,000 lbs./in.$^2$. In these compressors, the main components are a threaded main rotor and one or more gate rotors having teeth which mesh with the teeth on the main rotor. The main rotor is in a closely fitting housing having ports for the admission and discharge of gases and liquids. The compression process begins when gases are drawn into a rotor thread that is open to the suction plenum. After the thread has been filled, a gate rotor tooth rotates into position to close off the thread from the suction plenum. As the main rotor continues to turn, it decreases the volume of the thread which compresses the trapped gases.

During this process, copious amounts of liquid such as water are injected to seal the clearances between the main rotor and housing, main rotor and gate rotor, gate rotor and housing, and main rotor and discharge port. When the desired discharge pressure is reached, the main rotor thread uncovers a discharge port, and the high pressure air/water mixture is discharged through the port to a discharge plenum or discharge line. This process occurs simultaneously on both sides of the compressor main rotor to balance compression forces. However, these high pressure discharges contain alternating phases of air and liquid of differing densities that create a pulsating flow that results in high vibration levels in the downstream piping.

It is known to use tuyere-type centrifugal separators having a plurality of vanes as separators to remove liquids and solids from gases. The vanes impart a centrifugal motion that directs the entrained liquid and solid particles to the periphery of the shell or housing. From there the separated particles and liquid can be drained into a sump. It is known to use such centrifugal-tuyere separators for steam service downstream of steam engines for removal of condensate and for air service to remove liquid from air between stages and downstream of the compressor.

SUMMARY OF THE INVENTION

A process and apparatus is provided for reducing high vibration and pulsation levels generated by the discharge from compressors of high pressure air-water mixtures, especially when such air-water mixtures are discharged from a water-injected rotary positive displacement single screw compressor. A tuyere or blades are provided in or immediately downstream of the discharge port to impart to the mixture a circular flow of sufficient velocity to centrifugally separate the air and water into two separate concentric or colinear streams before leaving the compressor area.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views and wherein.

DETAILED DESCRIPTION OF THE INVENTION

Figure 1:
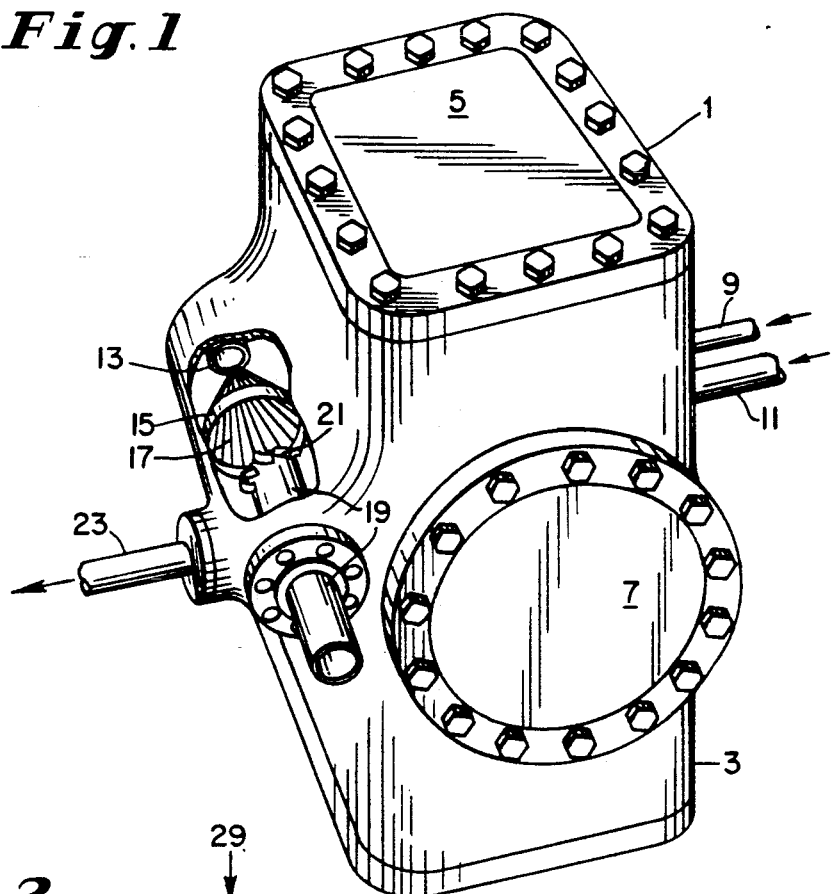
FIG. 1 is a prospective view having a partial cutaway section of a compressor having a tuyere at its discharge port within the compressor housing to separate high pressure gas-liquid mixtures into separate streams of liquid and gas.

The compressor shown generally at 1 in FIG. 1 comprises a housing 1 having access ports 5 and 7, a water inlet 9 and air inlet 11. A conventional water-injected rotary positive displacement single screw air compressor (not shown) is contained within housing 1. The high-pressure air-water mixture generated by the compressor screw exits line 13 and immediately contacts a tuyere 15 positioned adjacent thereto within housing 3.

Tuyere 15 is conically shaped with a plurality of blades 17 having a pitch angle designed to impart to the discharging air-water mixture a circular flow of sufficient velocity to centrifugally separate the water from the air mixture. Air discharging from the larger discharge end of tuyere 15 flows into the end of line 19. A plurality of reverse pitch blades 21 is located at the end thereof to retard the rotational component of the air velocity. The high pressure air, relatively free of water, then flows through line 19 and out of the compressor to the system piping which is not shown. Separated water accumulates and is discharged through line 23.

In a typical installation, the inlet water from line 9 is injected to seal clearances between the main rotor and housing, main rotor, gate rotor, and gate rotor and housing, and main rotor and discharge ports. The accumulated water from line 23 can be cooled and then reintroduced into line 9 for sealing purposes.

Figure 2:
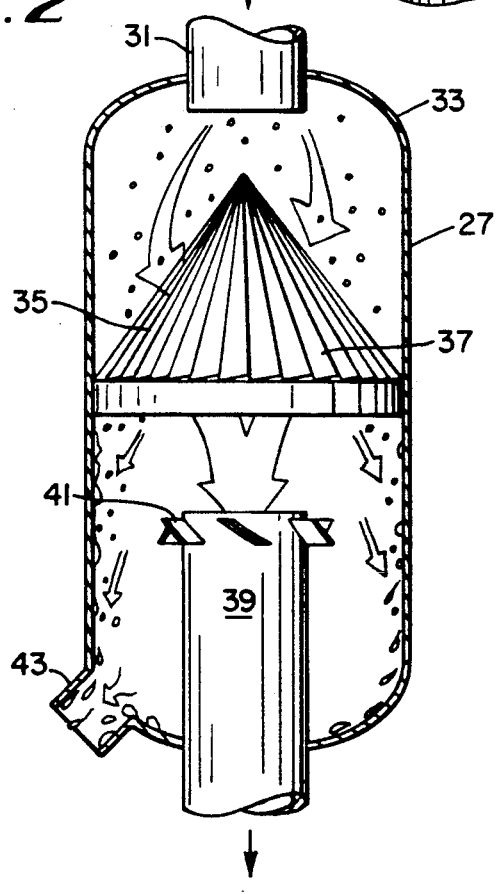
FIG. 2 is a cross-sectional view of a current air separation chamber which is typically attached downstream of the discharge of a water-injected rotary positive displacement single screw compressor to effect separation of air-water mixtures.

A prior art separation chamber is shown generally at 27 in FIG. 2. These chambers are generally attached well downstream from the compressor discharge port to effect separation of an air-water mixture. The separation chamber 27 comprises an inlet port 31 formed in housing 33 which is shown as generally cylindrically shaped.

A conically shaped tuyere 35 having a plurality of blades 37 occupies the cross-sectional area of housing 33. The blades 37 are designed to have a pitch angle to impart to the discharging air-water mixture circular flow at sufficient velocity to centrifugally separate the air-water mixture. The direction of flow of the air-water mixture is shown by the arrows in FIG. 2 flowing into the tuyere 35. The air flow out of the tuyere is also shown by the downward arrows.

Positioned at the discharge end (open end) of tuyere 35 is a conduit 39 having a plurality of blades 41 in the end thereafter which are at a pitch angle to reverse the circular direction of flow and cause further separation of the air-water mixture. The heavier water is spun to the outer periphery of housing 33 where it then discharges through discharge port 43. The air passes out of conduit 39 to the system piping which is not shown.

Figure 3:
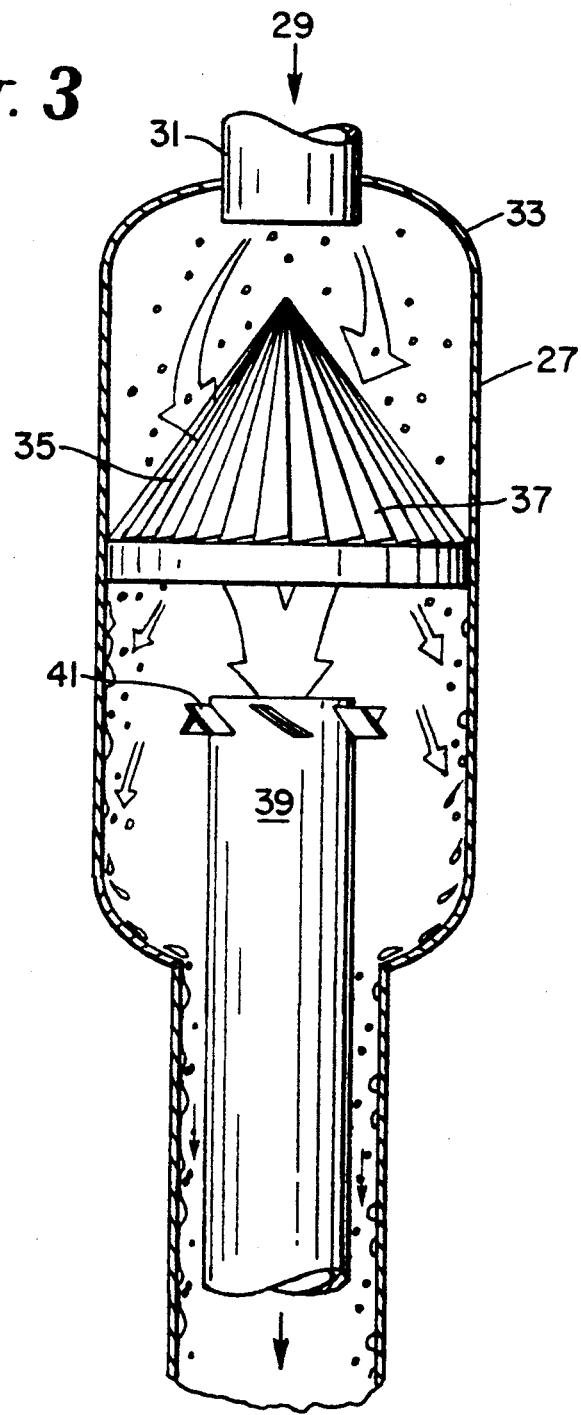
FIG. 3 is a cross-sectional view of a separation chamber in accordance with one aspect of the invention wherein the liquid is discharged through a pipe concentric with the gas discharge pipe.

FIG. 3 shows a cross-sectional separation chamber as in FIG. 2 with the discharge mechanism modified in accordance with one aspect of the invention. In this embodiment the gas still exits through conduit 39. However, the liquid is now discharged through conduit item 50 which surrounds and is concentric with conduit 39. These two conduits are routed to the gas piping system by conventional plumbing means not shown.

Figure 4:
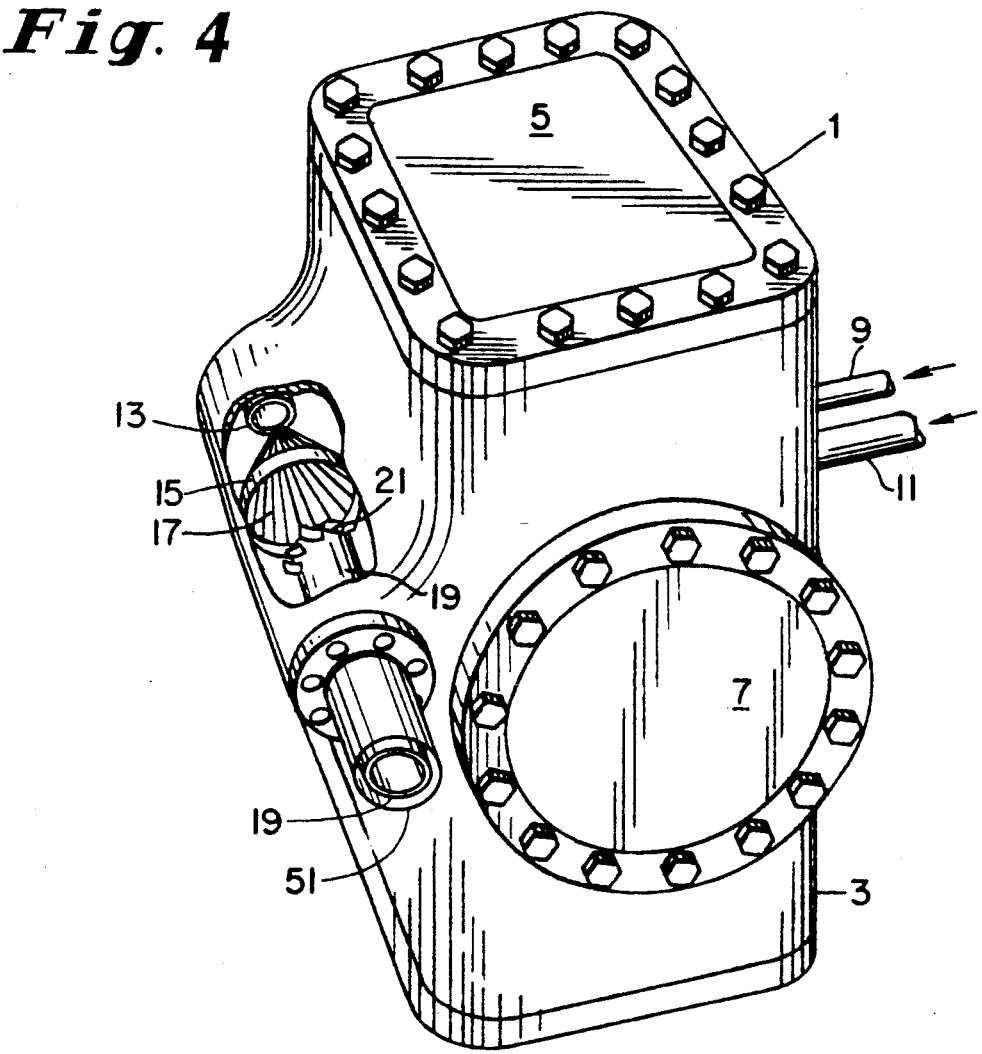
FIG. 4 is a modified embodiment of the FIG. 1 embodiment with concentric discharge means.

FIG. 4 shows a modification of the embodiment of FIG. 1 wherein the discharge mechanism is modified. In this embodiment the gas exits through conduit 19 However, the liquid is now discharged through conduit item 51 which surrounds and is concentric with conduit 19.

Separation of the air-water mixture produces a relatively smooth coaxial flow of air in the discharge piping. This substantially reduces the pressure-pulsation-induced vibrations normally generated in the plumbing by the discharged air-water mixture. The instant application illustrates applications of the invention using existing commercial separator technology. Other separation technologies can be used to accomplish the same end. The fundamental goal is to do the separation prior to as much of the plumbing on the discharge side of the compressor, as possible, and preferably before the discharge leaves the compressor housing.

Although the invention has been described as the separation of air-water mixtures, the principles of the invention are broader and extend to systems using any type liquid, for example, oil and to any type of gas. Also, the invention is not limited to use with single screw compressors but is equally applicable to multi-screw compressor systems.

From the foregoing description, one skilled in the art can easily ascertain the essential characteristics of this invention, and without departing from the spirit and scope thereof can make various changes of the invention to adapt it to serious usages and conditions.

What we claim is:

1. A compressed gas system for reducing vibration and pulsation levels in gas piping systems comprising:
 a housing,
 a liquid-injected rotary positive displacement screw gas compressor within said housing having an inlet port and a discharge port, a plenum chamber connected to said compressor at the discharge port thereof, separation means to impart to a gas-liquid mixture a circular flow of such velocity to separate gas and liquid into separate streams and means for diverting the liquid away from the compressed gas said compressor and said separation means being enclosed within said housing, said separation means including a tuyere, and said means for diverting the liquid away from the compressed gas includes a first conduit which surrounds and is concentric with a second conduit for carrying the gas, said first and second conduits forming a concentric arrangement of conduits and said concentric arrangement of conduits passes from the interior of said housing at said plenum through a wall of said housing to the exterior of said housing and means for removing liquid from said second conduit whereby the vibration and pulsation levels are reduced.

* * * * *